(12) United States Patent
Li

(10) Patent No.: US 9,739,432 B2
(45) Date of Patent: Aug. 22, 2017

(54) IMITATION CANDLE AND FLAME SIMULATION ASSEMBLY THEREOF

(71) Applicant: Xiaofeng Li, Shenzhen (CN)

(72) Inventor: Xiaofeng Li, Shenzhen (CN)

( * ) Notice: Subject to any disclaimer, the term of this patent is extended or adjusted under 35 U.S.C. 154(b) by 0 days.

(21) Appl. No.: 15/137,951

(22) Filed: Apr. 25, 2016

(65) Prior Publication Data

US 2017/0211766 A1 Jul. 27, 2017

(30) Foreign Application Priority Data

Jan. 27, 2016 (CN) .................... 2016 2 0080755 U
Jan. 27, 2016 (CN) .................... 2016 2 0081309 U

(51) Int. Cl.

| F21V 3/02 | (2006.01) |
|---|---|
| F21S 10/04 | (2006.01) |
| H05B 37/02 | (2006.01) |
| H05B 33/08 | (2006.01) |
| F21S 6/00 | (2006.01) |
| F21V 23/04 | (2006.01) |
| F21Y 115/10 | (2016.01) |

(52) U.S. Cl.
CPC ............ *F21S 10/04* (2013.01); *F21S 6/001* (2013.01); *F21V 23/04* (2013.01); *H05B 33/0845* (2013.01); *H05B 37/0236* (2013.01); *F21Y 2115/10* (2016.08)

(58) Field of Classification Search
CPC combination set(s) only.
See application file for complete search history.

(56) References Cited

U.S. PATENT DOCUMENTS

| 782,156 A | 2/1905 | Meeker |
|---|---|---|
| 817,772 A | 4/1906 | Helmer |
| 1,507,371 A | 8/1924 | Goodridge |
| 1,842,167 A | 1/1932 | Hall |
| 1,955,042 A | 4/1934 | Work |
| D102,561 S | 12/1936 | Lamb |
| 2,435,811 A | 2/1948 | Waters |
| 2,932,351 A | 6/1958 | Bried |
| 2,976,450 A | 3/1961 | Benoliel |
| 2,984,032 A | 5/1961 | Cornell |
| 3,166,863 A | 1/1965 | Gray |

(Continued)

FOREIGN PATENT DOCUMENTS

| CN | 1030823 | 2/1989 |
|---|---|---|
| CN | 2483103 | 3/2002 |

(Continued)

OTHER PUBLICATIONS

U.S. Appl. No. 15/132,548, filed Apr. 19, 2016, Li.

(Continued)

*Primary Examiner* — Douglas W Owens
*Assistant Examiner* — Jianzi Chen
(74) *Attorney, Agent, or Firm* — Perkins Coie LLP

(57) ABSTRACT

Imitation candle devices and systems with enhanced features enable simulation of a realistic candle flame using multiple light sources that illuminate a surface area of an imitation flame element in a controlled manner. The disclosed imitation candle devices further allow the candle to be turned on or off by pushing down on the flame element, thus eliminating a need for additional external switches.

29 Claims, 11 Drawing Sheets

(56) References Cited

U.S. PATENT DOCUMENTS

| | | |
|---|---|---|
| 3,233,093 A | 2/1966 | Gerlat |
| 3,373,274 A | 3/1968 | Kott |
| 3,384,774 A | 5/1968 | English |
| 3,425,157 A | 2/1969 | Hartsock |
| 3,479,561 A | 11/1969 | Janning |
| 3,514,660 A | 5/1970 | Kopelman |
| 3,603,013 A | 9/1971 | Gardiner |
| 3,639,749 A | 2/1972 | Beckman |
| 3,681,588 A | 8/1972 | Lee |
| 3,814,973 A | 6/1974 | Thouret et al. |
| 3,890,085 A | 6/1975 | Andeweg |
| 4,026,544 A | 5/1977 | Plambeck et al. |
| 4,067,111 A | 1/1978 | Truitt |
| 4,187,532 A | 2/1980 | Naffier |
| 4,328,534 A | 5/1982 | Abe |
| 4,477,249 A | 10/1984 | Ruzek et al. |
| 4,550,363 A | 10/1985 | Sandell |
| 4,551,794 A | 11/1985 | Sandell |
| 4,617,614 A | 10/1986 | Lederer |
| 4,728,871 A | 3/1988 | Andrews |
| 4,764,853 A | 8/1988 | Thomas |
| 4,777,571 A | 10/1988 | Morgan |
| 4,866,580 A | 9/1989 | Blackerby |
| 4,965,707 A | 10/1990 | Butterfield |
| 5,072,208 A | 12/1991 | Christensen |
| 5,097,180 A | 3/1992 | Ignon et al. |
| 5,152,602 A | 10/1992 | Boschetto |
| 5,381,325 A | 1/1995 | Messana |
| 5,550,452 A | 8/1996 | Shirai |
| 5,582,478 A | 12/1996 | Ambrosino |
| 5,707,282 A | 1/1998 | Clements et al. |
| 5,924,784 A | 7/1999 | Chliwnyj et al. |
| 5,936,521 A | 8/1999 | Blackman |
| 6,198,229 B1 | 3/2001 | McCloud |
| 6,241,362 B1 | 6/2001 | Morrison |
| 6,257,755 B1 | 7/2001 | Sevelle |
| 6,302,555 B1 | 10/2001 | Bristow |
| 6,312,137 B1 | 11/2001 | Hsieh |
| 6,454,425 B1 | 9/2002 | Lin |
| 6,461,011 B1 | 10/2002 | Harrison |
| 6,491,516 B1 | 12/2002 | Tal et al. |
| 6,511,219 B2 | 1/2003 | Sevelle |
| D486,924 S | 2/2004 | Skradski et al. |
| 6,688,752 B2 | 2/2004 | Moore |
| 6,712,493 B2 | 3/2004 | Tell et al. |
| 6,757,487 B2 | 6/2004 | Martin et al. |
| 6,781,270 B2 | 8/2004 | Long |
| 6,953,401 B2 | 10/2005 | Starr |
| 6,955,440 B2 | 10/2005 | Niskanen |
| 6,966,665 B2 | 11/2005 | Limburg et al. |
| 7,029,146 B2 | 4/2006 | Kitchen |
| 7,066,637 B2 | 6/2006 | Nozawa |
| 7,080,472 B2 | 7/2006 | Schroeter et al. |
| 7,083,315 B2 | 8/2006 | Hansler et al. |
| 7,093,949 B2 | 8/2006 | Hart et al. |
| 7,111,421 B2 | 9/2006 | Corry et al. |
| 7,118,243 B2 | 10/2006 | McCavit et al. |
| 7,125,142 B2 | 10/2006 | Wainwright |
| 7,159,994 B2 | 1/2007 | Schnuckle et al. |
| D545,458 S | 6/2007 | Jensen |
| 7,261,455 B2 | 8/2007 | Schnuckle et al. |
| 7,300,179 B1 | 11/2007 | LaDuke et al. |
| 7,305,783 B2 | 12/2007 | Mix et al. |
| D567,993 S | 4/2008 | Shiu |
| 7,360,935 B2 | 4/2008 | Jensen et al. |
| 7,410,269 B2 | 8/2008 | Harrity |
| D576,317 S | 9/2008 | Jensen |
| D589,176 S | 3/2009 | Huang et al. |
| D599,491 S | 9/2009 | Luo |
| 7,633,232 B2 | 12/2009 | Wong |
| 7,686,471 B2 | 3/2010 | Reichow |
| RE41,628 E | 9/2010 | Barbeau |
| 7,824,627 B2 | 11/2010 | Michaels et al. |
| 7,828,462 B2 | 11/2010 | Jensen et al. |
| 7,837,355 B2 | 11/2010 | Schnuckle |
| 8,070,319 B2 | 12/2011 | Schnuckle et al. |
| 8,081,872 B2 | 12/2011 | Wang |
| 8,132,936 B2 | 3/2012 | Patton et al. |
| 8,210,708 B2 | 7/2012 | Hau et al. |
| 8,235,558 B1 | 8/2012 | Lauer |
| 8,256,935 B1 | 9/2012 | Cullimore et al. |
| 8,342,712 B2 | 1/2013 | Patton et al. |
| 8,454,190 B2 | 6/2013 | Hau et al. |
| 8,534,869 B2 | 9/2013 | Patton et al. |
| 8,550,660 B2 | 10/2013 | Patton et al. |
| 8,646,946 B2 | 2/2014 | Schnuckle et al. |
| 8,696,166 B2 | 4/2014 | Patton et al. |
| 8,721,118 B2 | 5/2014 | Patton |
| 8,727,569 B2 | 5/2014 | Schnuckle et al. |
| 8,789,986 B2 | 7/2014 | Li |
| 8,894,261 B2 | 11/2014 | Chen |
| 8,926,137 B2 | 1/2015 | Li |
| 8,998,461 B2 | 4/2015 | Gutstein et al. |
| 9,033,553 B2 | 5/2015 | Li |
| 9,052,078 B2 | 6/2015 | Sheng |
| D740,460 S | 10/2015 | Thompson et al. |
| D743,096 S | 11/2015 | Patton et al. |
| D748,322 S | 1/2016 | Patton et al. |
| D748,843 S | 2/2016 | Thompson et al. |
| D752,276 S | 3/2016 | Thompson et al. |
| 9,322,523 B2 | 4/2016 | Patton et al. |
| 9,335,014 B2 | 5/2016 | Li |
| 9,360,181 B2 | 6/2016 | Li |
| 9,366,402 B2 | 6/2016 | Li |
| 9,371,972 B2 | 6/2016 | Li |
| 9,371,973 B2 | 6/2016 | Li |
| 9,447,938 B2 | 9/2016 | Li |
| 9,541,247 B2 | 1/2017 | Patton |
| D779,707 S | 2/2017 | Thompson et al. |
| 9,572,236 B2 | 2/2017 | Patton |
| D781,488 S | 3/2017 | Patton |
| 9,591,729 B2 | 3/2017 | Patton |
| 9,605,824 B1 | 3/2017 | Li |
| 9,625,112 B2 | 4/2017 | Li |
| 2001/0033488 A1* | 10/2001 | Chliwnyj ............... F21S 10/04 362/231 |
| 2002/0080601 A1 | 6/2002 | Meltzer |
| 2003/0041491 A1 | 3/2003 | Mix |
| 2003/0053305 A1 | 3/2003 | Lin |
| 2003/0072154 A1 | 4/2003 | Moore |
| 2004/0114351 A1 | 6/2004 | Stokes et al. |
| 2004/0165374 A1 | 8/2004 | Robinson |
| 2004/0223326 A1 | 11/2004 | Wainwright |
| 2005/0007779 A1 | 1/2005 | Nozawa |
| 2005/0097792 A1 | 5/2005 | Naden |
| 2005/0169812 A1 | 8/2005 | Helf |
| 2005/0196716 A1 | 9/2005 | Haab et al. |
| 2005/0225984 A1 | 10/2005 | Theobald |
| 2005/0254248 A1 | 11/2005 | Lederer |
| 2005/0285538 A1 | 12/2005 | Jaworski et al. |
| 2006/0034079 A1 | 2/2006 | Schnuckle et al. |
| 2006/0034100 A1 | 2/2006 | Schnuckle et al. |
| 2006/0101681 A1 | 5/2006 | Hess et al. |
| 2006/0120080 A1 | 6/2006 | Sipinski et al. |
| 2006/0146544 A1 | 7/2006 | Leung |
| 2006/0192503 A1 | 8/2006 | Trombetta |
| 2007/0002560 A1 | 1/2007 | Gutstein et al. |
| 2007/0053174 A1 | 3/2007 | Lin |
| 2007/0127249 A1 | 6/2007 | Medley et al. |
| 2007/0154857 A1 | 7/2007 | Cho |
| 2007/0159422 A1 | 7/2007 | Blandino et al. |
| 2007/0223217 A1 | 9/2007 | Hsu |
| 2007/0236947 A1 | 10/2007 | Jensen et al. |
| 2008/0074875 A1 | 3/2008 | Jensen et al. |
| 2008/0112154 A1 | 5/2008 | Reichow |
| 2008/0129226 A1 | 6/2008 | DeWitt et al. |
| 2008/0130266 A1 | 6/2008 | DeWitt et al. |
| 2008/0151563 A1 | 6/2008 | Chen |
| 2008/0151571 A1 | 6/2008 | Chen |
| 2009/0059596 A1 | 3/2009 | Lederer |
| 2009/0135586 A1 | 5/2009 | Yang |
| 2010/0001662 A1 | 1/2010 | Nelkin |
| 2010/0079999 A1 | 4/2010 | Schnuckle |
| 2010/0134022 A1 | 6/2010 | Gutstein et al. |

(56) References Cited

U.S. PATENT DOCUMENTS

| | | |
|---|---|---|
| 2010/0207538 A1 | 8/2010 | Chen |
| 2011/0000666 A1 | 1/2011 | Couto |
| 2011/0019422 A1 | 1/2011 | Schnuckle |
| 2011/0110073 A1 | 5/2011 | Schnuckle et al. |
| 2011/0127914 A1 | 6/2011 | Patton |
| 2011/0195787 A1 | 8/2011 | Wells |
| 2011/0204828 A1 | 8/2011 | Moody et al. |
| 2011/0317403 A1 | 12/2011 | Fournier et al. |
| 2012/0049765 A1 | 3/2012 | Lu |
| 2012/0093491 A1 | 4/2012 | Browder |
| 2012/0134157 A1 | 5/2012 | Li |
| 2013/0050985 A1 | 2/2013 | Kwok et al. |
| 2013/0163249 A1 | 6/2013 | Miura |
| 2013/0223043 A1 | 8/2013 | Ray |
| 2013/0265748 A1 | 10/2013 | Hau et al. |
| 2014/0035483 A1 | 2/2014 | Becker |
| 2014/0140042 A1 | 5/2014 | Schreiber |
| 2014/0211499 A1 | 7/2014 | Fong |
| 2014/0218903 A1 | 8/2014 | Sheng |
| 2014/0254148 A1 | 9/2014 | Fournier |
| 2014/0268652 A1 | 9/2014 | Li |
| 2014/0268704 A1 | 9/2014 | Yang |
| 2014/0274212 A1 | 9/2014 | Zurek et al. |
| 2014/0286024 A1 | 9/2014 | Li |
| 2014/0313694 A1 | 10/2014 | Patton |
| 2014/0362592 A1 | 12/2014 | Lee |
| 2015/0008845 A1 | 1/2015 | Kim |
| 2015/0036348 A1 | 2/2015 | Dong |
| 2015/0070874 A1 | 3/2015 | Beesley |
| 2015/0109786 A1 | 4/2015 | Li |
| 2015/0124442 A1 | 5/2015 | Ding |
| 2015/0233538 A1 | 8/2015 | Sheng |
| 2015/0292698 A1 | 10/2015 | Li |
| 2015/0308643 A1 | 10/2015 | Huang |
| 2015/0369431 A1 | 12/2015 | Li |
| 2015/0369432 A1 | 12/2015 | Li |
| 2015/0373815 A1 | 12/2015 | Patton |
| 2016/0040844 A1 | 2/2016 | Patton |
| 2016/0047517 A1 | 2/2016 | Li |
| 2016/0057829 A1 | 2/2016 | Li |
| 2016/0109082 A1 | 4/2016 | Li |
| 2016/0109083 A1 | 4/2016 | Li |
| 2016/0163630 A1 | 6/2016 | Kummerl |
| 2016/0186947 A1 | 6/2016 | Li |
| 2016/0258584 A1 | 9/2016 | Li |
| 2016/0290580 A1 | 10/2016 | Li |
| 2017/0067606 A1 | 3/2017 | Li |

FOREIGN PATENT DOCUMENTS

| | | |
|---|---|---|
| CN | 2551859 | 5/2003 |
| CN | 2562059 Y | 7/2003 |
| CN | 1530141 A | 9/2004 |
| CN | 1646177 A | 7/2005 |
| CN | 2854329 Y | 1/2007 |
| CN | 2888274 Y | 4/2007 |
| CN | 2924266 | 7/2007 |
| CN | 200940808 Y | 8/2007 |
| CN | 201011621 Y | 1/2008 |
| CN | 201059432 Y | 5/2008 |
| CN | 201093300 | 7/2008 |
| CN | 201103952 Y | 8/2008 |
| CN | 201159425 Y | 12/2008 |
| CN | 101408284 A | 4/2009 |
| CN | 201235095 Y | 5/2009 |
| CN | 201418887 Y | 3/2010 |
| CN | 201533921 U | 7/2010 |
| CN | 101865413 A | 10/2010 |
| CN | 201643048 U | 11/2010 |
| CN | 102147095 A | 8/2011 |
| CN | 102563510 A | 7/2012 |
| CN | 102734740 A | 10/2012 |
| CN | 102748589 A | 10/2012 |
| CN | 202708962 U | 1/2013 |
| CN | 202791780 U | 3/2013 |
| CN | 203131550 | 8/2013 |
| CN | 103322500 A | 9/2013 |
| CN | 20329818 U | 11/2013 |
| CN | 203273669 | 11/2013 |
| CN | 203273670 U | 11/2013 |
| CN | 203431703 U | 2/2014 |
| CN | 203442498 U | 2/2014 |
| CN | 203517611 U | 4/2014 |
| CN | 203571618 U | 4/2014 |
| CN | 104048246 | 9/2014 |
| CN | 104089241 | 10/2014 |
| CN | 203940346 | 11/2014 |
| CN | 204268356 | 4/2015 |
| DE | 1489617 A1 | 5/1969 |
| DE | 212011100014 U1 | 4/2012 |
| DE | 102012206988 A1 | 10/2013 |
| DE | 202014100821 U1 | 4/2014 |
| DE | 202013012047 | 4/2015 |
| DE | 202015000490 | 4/2015 |
| DE | 202015102274 | 6/2015 |
| EP | 0138786 A1 | 4/1985 |
| EP | 0855189 A2 | 7/1998 |
| EP | 1639291 B1 | 3/2006 |
| EP | 1838110 A1 | 9/2007 |
| EP | 2587127 A1 | 5/2013 |
| GB | 499745 | 1/1939 |
| GB | 2230335 | 10/1990 |
| GB | 2267746 | 12/1993 |
| GB | 2323159 A | 9/1998 |
| GB | 2379731 A | 3/2003 |
| GB | 2385413 A | 8/2003 |
| GB | 2443926 | 5/2008 |
| GB | 2455598 A | 6/2009 |
| GB | 2527626 | 12/2015 |
| JP | H0652709 | 2/1994 |
| JP | H1057464 A | 3/1998 |
| JP | 2000284730 A | 10/2000 |
| JP | 2008180755 A | 8/2008 |
| KR | 101174246 | 8/2012 |
| WO | WO-8202756 A1 | 8/1982 |
| WO | WO-8503561 A1 | 8/1985 |
| WO | WO-8704506 A1 | 7/1987 |
| WO | WO-9625624 A1 | 8/1996 |
| WO | WO-0192780 | 12/2001 |
| WO | WO-03011349 | 2/2003 |
| WO | WO-2006020839 A2 | 2/2006 |
| WO | WO2007002560 A1 | 1/2007 |
| WO | WO-2008092753 A2 | 8/2008 |
| WO | WO2010009575 | 1/2010 |
| WO | WO-2012000418 A1 | 1/2012 |
| WO | WO2012099718 | 7/2012 |
| WO | WO2012162538 A1 | 11/2012 |
| WO | WO-2013020263 A2 | 2/2013 |
| WO | WO2013020439 | 2/2013 |
| WO | WO2014139483 A1 | 9/2014 |
| WO | WO2016000517 A1 | 1/2016 |

OTHER PUBLICATIONS

U.S. Appl. No. 15/197,354, filed Jun. 29, 2016, Li.

Non-Final Office Action for U.S. Appl. No. 12/273,337 mailed Jun. 17, 2011, 16 pages.

Notice of Allowance for U.S. Appl. No. 12/273,337 mailed Mar. 26, 2012, 8 pages.

Final Office Action for U.S. Appl. No. 12/273,337 mailed Jan. 18, 2012, 17 pages.

Non-Final Office Action for U.S. Appl. No. 13/526,067 mailed Oct. 22, 2012, 23 pages.

Notice of Allowance for U.S. Appl. No. 13/526,067 mailed Feb. 6, 2013, 8 pages.

Non-Final Office Action for U.S. Appl. No. 13/908,571 mailed Sep. 6, 2013, 11 pages.

Final Office Action for U.S. Appl. No. 13/908,571 mailed Mar. 18, 2014, 20 pages.

Final Office Action for U.S. Appl. No. 13/098,571 mailed Sep. 30, 2014, 18 pages.

U.S. Appl. No. 61/101,611 to Schnuckle.

(56) References Cited

OTHER PUBLICATIONS

U.S. Appl. No. 61/293,516 to Patton.
International Search Report and Written Opinion for PCT Application No. PCT/CN/2014/073557 mailed Jul. 2, 2014.
International Search Report for PCT Application No. PCT/US2009/054401 mailed Oct. 26, 2009.
EP Search Report for European Patent Application No. 12185984.7 mailed Dec. 14, 2012.
Engineer's Handbook (Epoxy definition), http://engineershandbook.com/Materials/epoxy.htm, Jul. 18, 2013.
Nagashima, H. et al., "Introduction to Chaos, Physics and Mathematics of Chaotic Phenomena," Institute of Physics Publishing, 1999.
Definition of "Electromagnet" in the Encarta World English Dictionary, Aug. 1999.
Lab M3: The Physical Pendulum, Physics 1140—Experimental Physics, Course Laboratory Instructions, 2000.
U.S. Appl. No. 15/145,739, filed May 3, 2016, Li.
Notice of Allowance for U.S. Appl. No. 13/325,754 mailed Jun. 18, 2014, 10 pages.
Non-Final Office Action for U.S. Appl. No. 13/325,754 mailed Dec. 30, 2013, 14 pages.
Notice of Allowance for U.S. Patent Application No. 14/161,143, mailed Nov. 13, 2014, 18 pages.
Final Office Action for U.S. Appl. 14/161,143, mailed Oct. 20, 2014, 15 pages.
Non-Final Office Action for U.S. Appl. No. 14/161,143 mailed Apr. 30, 2014, 18 pages.
Non-Final Office Action for U.S. Appl. No. 14/558,507 mailed Sep. 2, 2015, 21 pages.
Notice of Allowance for U.S. Appl. No. 14/588,507 mailed Dec. 4, 2015, 11 pages.
Non-Final Office Action for U.S. Appl. No. 14/558,507 mailed Mar. 17, 2016, 18 pages.
Notice of Allowance for U.S. Appl. No. 14/588,507 mailed May 3, 2016, 7 pages.
Non-Final Office Action for U.S. Appl. No. 14/925,893 mailed Feb. 25, 2016, 37 pages.
Final Office Action for U.S. Appl. 14/925,893, mailed Apr. 26, 2016, 29 pages.
Non-Final Office Action for U.S. Appl. No. 14/925,893 mailed May 16, 2016, 13 pages.
Non-Final Office Action for U.S. Appl. No. 14/925,899 mailed Jan. 5, 2016, 21 pages.
Non-Final Office Action for U.S. Appl. No. 14/925,899 mailed Apr. 14, 2016, 25 pages.
Non-Final Office Action for U.S. Appl. No. 14/927,213 mailed Feb. 25, 2016, 33 pages.
Notice of Allowance for U.S. Appl. No. 14/927,213 mailed May 11, 2016, 12 pages.
Non-Final Office Action for U.S. Appl. No. 14/925,899 mailed May 25, 2016, 18 pages.
Supplementary Search Report and Opinion for EP 14764844, Jul. 28, 2016, 12 pages.
Non-Final Office Action for U.S. Appl. No. 15/145,739 mailed Jul. 27, 2016, 22 pages.
Notice of Allowance for U.S. Appl. No. 14/925,893, mailed Jul. 20, 2016, 9 pages.
Notice of Allowance for U.S. Appl. No. 14/925,899, mailed Aug. 3, 2016, 9 pages.
Non-Final Office Action for U.S. Appl. No. 15/061,648 mailed Jul. 12, 2016, 47 pages.
Non-Final Office Action for U.S. Appl. No. 14/449,865 mailed Feb. 3, 2016, 9 pages.
Final Office Action for U.S. Appl. No. 14/928,696 mailed Jul. 14, 2016, 27 pages.
International Search Report for PCT/CN2014/091362, mailed Apr. 3, 2015, 2 pages.
Non-Final Office Action for U.S. Appl. No. 15/187,618, mailed Aug. 18, 2016, 13 pages.

Notice of Allowance for U.S. Appl. No. 15/158,508 mailed Sep. 21, 2016, 8 pages.
Notice of Allowance for U.S. Appl. No. 15/061,648, mailed Sep. 23, 2016, 9 pages.
Notice of Allowance for U.S. Appl. No. 15/158,508, mailed Sep. 21, 2016, 8 pages.
UK Combined Search and Examination Report for GB1613387.8, mailed Sep. 9, 2016, 10 pages.
UK Combined Search and Examination Report for GB1613393.6, mailed Sep. 9, 2016, 10 pages.
Canadian Examination and Search Report for CA2936224, mailed Sep. 30, 2016, 5 pages.
UK Combined Search and Examination Report for GB1613391.0, mailed Sep. 19, 2016, 9 pages.
U.S. Appl. No. 15/411,869, filed Jan. 20, 2017, Li.
U.S. Appl. No. 15/413,305, filed Jan. 23, 2017, Li.
U.S. Appl. No. 15/150,057, filed May 9, 2016, Li.
U.S. Appl. No. 15/322,237, filed Nov. 18, 2014, Li.
U.S. Appl. No. 15/418,451, filed Jan. 27, 2017, Li.
U.S. Appl. No. 15/441,143, filed Feb. 23, 2017, Li.
U.S. Appl. No. 15/451,351, filed Mar. 6, 2017, Li.
U.S. Appl. No. 15/368,168, filed Dec. 2, 2016, Li.
U.S. Appl. No. 15/451,361, filed Mar. 6, 2017, Li.
Notice of Allowance for U.S. Appl. No. 14/449,865 dated Nov. 16, 2016, 15 pages.
Notice of Allowance for U.S. Appl. No. 15/145,739 dated Nov. 17, 2016, 11 pages.
Notice of Allowance for U.S. Appl. No. 15/187,618 dated Nov. 30, 2016, 12 pages.
Canadian Examination and Search Report for CA2936225, dated Sep. 29, 2016, 5 pages.
Non-Final Office Action for U.S. Appl. No. 15/371,103, dated Jan. 25, 2017, 45 pages.
Notice of Allowance for Canadian Patent Application No. 2,930,065, dated Feb. 9, 2017 from the Canadian Intellectual Property Office.
Canadian Examination Report for CA2930099, dated Jan. 5, 2017 from the Canadian Intellectual Property Office, 3 pages.
Translated Office Action issued by the German patent and Trade Mark Office dated Dec. 19, 2016 for Application No. 102016008225.9, 5 pages.
Notice of Allowance for U.S. Appl. No. 15/207,411 dated Jan. 20, 2017, 23 pages.
Notice of Allowance for Canadian Patent Application No. 2,936,225, dated Jan. 16, 2017 from the Canadian Intellectual Property Office.
Non-Final Office Action for U.S. Appl. No. 15/197,354, dated Jan. 19, 2017, 36 pages.
Canadian Examination Report for CA2936224, dated Feb. 9, 2017 from the Canadian Intellectual Property Office, 5 pages.
Non-Final Office Action for U.S. Appl. No. 15/368,168, dated Mar. 13, 2017, 36 pages.
Translated Office Action issued by the German patent and Trade Mark Office dated Mar. 16, 2017 for Application No. 102016008825.7, 8 pages.
Non-Final Office Action for U.S. Appl. No. 15/355,408, dated Feb. 8, 2017, 26 pages.
Notice of Allowance for U.S. Appl. No. 14/672,819, dated Jan. 27, 2017, 14 pages.
Translated Office Action issued by the German patent and Trade Mark Office dated Feb. 16, 2017 for Application No. 102016008226.7, 6 pages.
Notice of Allowance for U.S. Appl. No. 15/371,103 dated Apr. 12, 2017, 10 pages.
Translated Office Action issued by the German patent and Trade Mark Office dated Mar. 2, 2017 for Application No. 102016009125.8, 5 pages.
MiPow Playbulb Candle, Android, http://www.mipow.de/smart-home/29/mipow-playbulb-candle, archived on http://www.archive.org on May 14, 2016 [accessed Mar. 2, 2017].

(56) References Cited

OTHER PUBLICATIONS

CHIP: Progimax Candle, http://beste-apss.chip.de/android/app/kostenloses-candle-kerzen-app-fuer-den-androiden.com.progimax.candle.free/ , archived on http://www.archive.org on Dec. 30, 2013 [accessed on Mar. 2, 2017].

* cited by examiner

IMITATION CANDLE AND FLAME SIMULATION ASSEMBLY THEREOF

RELATED APPLICATIONS

This patent document claims priority to the Chinese patent application no. CN201620081309.2 filed on Jan. 27, 2016, and the Chinese patent application no. CN201620080755.1, filed on Jan. 27, 2016. The entire contents of the before mentioned patent applications are incorporated by reference in this patent document.

FIELD OF INVENTION

The subject matter of this patent document relates to candle devices that use an imitation flame, and particularly, to features that enhance the use and realistic appearance of imitation candle devices.

BACKGROUND

An electronic candle (sometimes referred to as an electronic candle or an LED candle) has evolved from a simple model that simulates the shape of a candle using an LED light to more sophisticated models with advanced features such as additional flame colors and additional styles. With no open flame or hot melted wax, flameless candles provide a longer-lasting, safe, and clean alternative to real candles, and, at the same time, can be used an ornaments, and for creating various lighting options.

Some electronic candles use a movable flame element, which when illuminated by light from a light source, such as an LED, provides an illusion of a flickering candle flame. In other electronic candles, the flame element can be stationary and a flickering flame effect is simulated by, for example, changing the manner in which the flame element is illuminated.

SUMMARY OF CERTAIN EMBODIMENTS

The disclosed embodiments relate to devices and methods for producing a more realistic flame element for use in imitation candle devices. The disclosed embodiments further facilitate the operations and usage of electronic candle devices.

One exemplary aspect of the disclosed embodiments relates to an imitation candle device that includes a flame element shaped to resemble a candle flame and protruding from top of the imitation candle device, as well as a plurality of light emitting elements located within the imitation candle device and positioned to illuminate a plurality of areas on the flame element. The imitation candle device also includes electronic circuitry coupled to the plurality of light emitting elements to selectively modulate an intensity of each of the plurality of light emitting elements to simulate a flame movement in one or both of a vertical and a horizontal direction, wherein selective modulation of the plurality of light emitting elements includes generation of electric signals to modify an intensity of one or more of the plurality of illuminated areas positioned on a lower section of the flame element separately from one or more other illuminated areas on the flame element.

Another aspect of the disclosed embodiments relates to a light-emitting control assembly for use in an electronic candle that includes a plurality of light emitting elements positioned at an angle with respect to a vertical axis that passes through center of the light-emitting control assembly. Each of the plurality of light emitting elements are positioned to project a spot of light for illuminating a particular area of a flame element, and the plurality of light emitting elements are positioned to project a set of partially overlapping light spots and a set of substantially non-overlapping light spots. The a light-emitting control assembly further includes a circuit board comprising a microcontroller coupled to the plurality of light emitting elements to produce electrical signals to modulate an intensity of a first group of light emitting elements separately from a second group of light emitting elements and to simulate an appearance of a moving flame upon projection of the overlapping light spots and the substantially non-overlapping light spots on the flame element.

DETAILED DESCRIPTION OF CERTAIN EMBODIMENTS

In this patent document, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

Imitation candle devices can simulate a real candle with a flame that resembles a real-life flame with flickering effects using optical, mechanical and electrical components. The disclosed embodiments relate to features that enhance the appearance of a real candle flame, and further facilitate the operations of imitation candle devices, and expand the functionalities of such devices.

In one embodiment, an imitation candle device for producing a simulated flame is provided that includes a flame simulation assembly for controlling light emitting elements that produce a flickering effect resembling a real flame.

Figure 1:
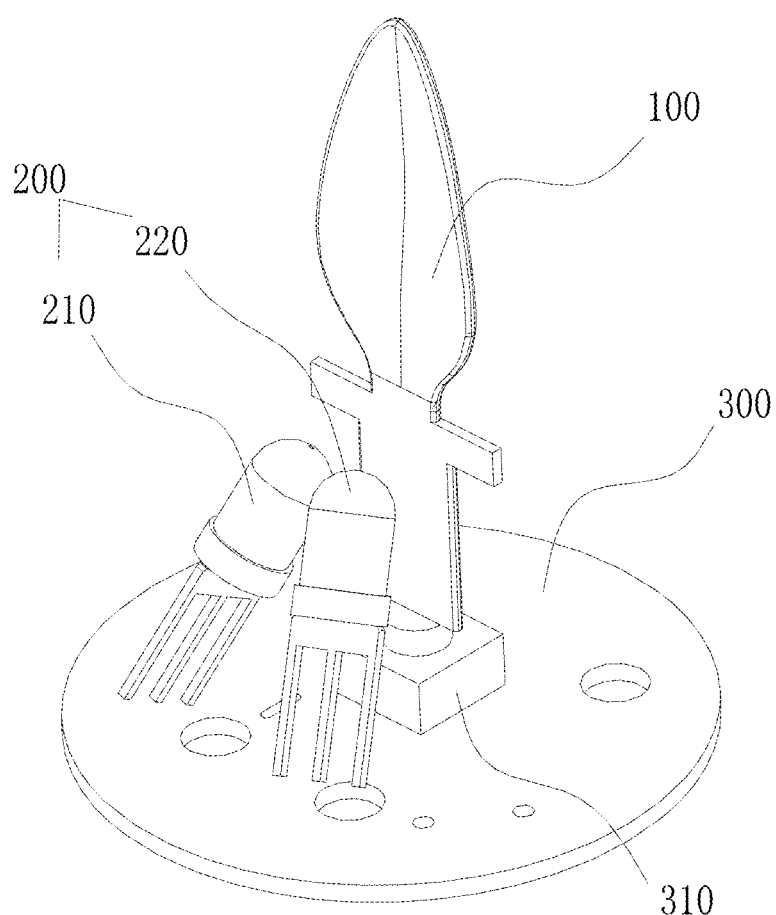
FIG. 1 illustrates a flame simulation assembly in accordance with an exemplary embodiment.

Referring to FIG. 1, an exemplary flame simulation assembly is shown that includes a flame element 100 that is shaped to resemble a flame, at least one light source 200 that is used to simulate flame, and a circuit board 300 that controls the light source 200 connected thereto. The flame element 100 is disposed on top of a switch 310 that is connected to the circuit board 300. An operator may trigger the touch switch 310 by moving (e.g., pressing down on) the flame piece 100, without a need to hold the electronic candle, which makes this on-off mechanism very convenient. Moreover, the use of the flame element 100 as a control switch improves the appearance of the imitation candle device since no external buttons or switches are needed.

In the configuration of FIG. 1, the light source 200 includes two light producing devices 210 and 220 that are positioned to transmit light onto a surface of the flame element 100. The light producing devices 210 and 220 can illuminate different areas on the same side of the flame element 100. The circuit board 300 controls different light producing devices of the light source 200 to, for example, turn the light producing devices on or off, and to vary the brightness of the illuminated areas on the flame element 100, and to thereby create a flickering candle light effect.

The control of light producing devices 210 and 220 may be governed by the circuit board 300 according to a regular pattern, or in accordance with an irregular pattern, depending on the desired visual effects. Generally, the light producing devices 210 and 220 may be turned on or off alternatively, so that the flame element 100 looks more like a flickering candle light.

Figure 2A:
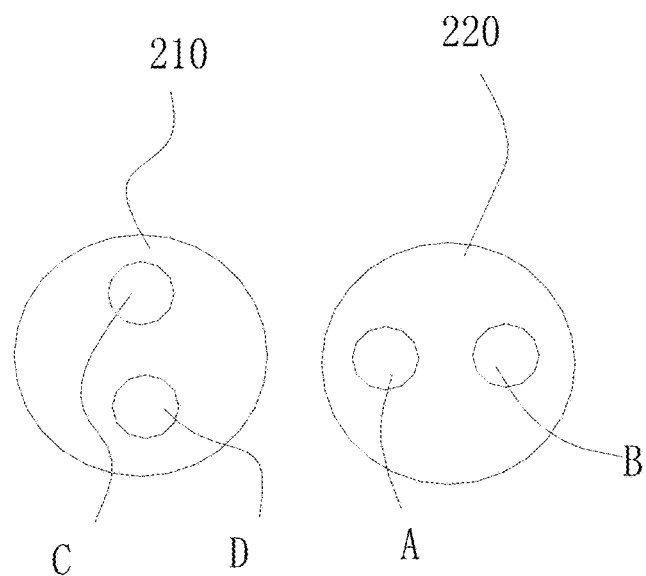
FIG. 2(A) illustrates two exemplary light producing devices that are used in the flame simulation assembly of FIG. 1.
Figure 2B:
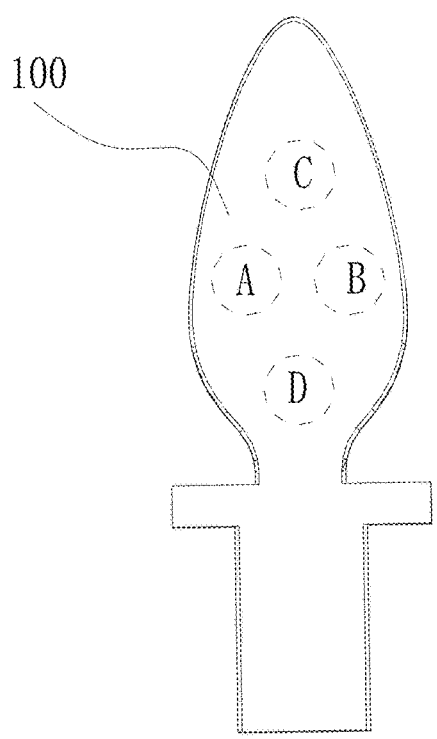
FIG. 2(B) illustrates projection of light spots produced by light producing elements in accordance with an exemplary embodiment.

Referring to FIG. 2(A), the two light producing devices 210 and 220 of the light source 220 are illustrated as each including two light emitting elements. In particular, light emitting elements A and B of the light producing device 220 are disposed in a horizontal configuration, and the light producing device 210 includes light emitting elements C and D that are disposed in a vertical configuration. Referring to FIG. 2(B), the surface of the flame element 100 can be generally divided into four areas: an upper area, a lower area, a left area and a right area. The light emitting elements A, B, C, and D are positioned in such way to illuminate the flame element 100 on the left, right, upper and lower areas, respectively. It should be noted that the depicted illumination areas corresponding to light emitting elements A, B, C, and D are only approximations of the illuminated areas, and their corresponding sizes may be modified as needed, and the illumination spots can at least partially diffuse into one another.

In some embodiments, each of the light producing devices 210 and 220 is an LED device, and each LED device includes a plurality of chips or light emitting elements disposed therein. The light emitting elements can produce corresponding illuminations with different divergence characteristics. In some embodiments, all light emitting elements that are packaged within a light producing device have the same color. In some embodiments, all light emitting elements of the electric candle device have the same color.

The flickering appearance of a flame may be improved under a controlled modulation of the four different light sources. For example, in a real flame, the wick absorbs part of the flame movements in the vertical direction, and thus our studies of the movement and flicker of real flames have revealed that independent control of the horizontal versus vertical illumination of an the artificial flame surface can improve the appearance of a real flame. In this regard, the configurations that are presented in FIGS. 2(A) and 2(B) can be used to effectuate a more realistic flickering effect. For example, by turning the light emitting element A on and light emitting element B off, followed by turning the light emitting element A off and light emitting element B on, a visual simulation of horizontally flickering may be formed. Likewise, turning the light emitting elements C and D on and off can create a visual simulation of a vertical flickering.

The above described flame simulation assembly adopts a structure of a light-emitting unit having at least two elements or chips that illuminate different areas on the same side of a flame element. By controlling the on-off pattern of the light emitting elements, a visual simulation of a flickering flame in various directions is formed.

In some embodiments, more than four light emitting elements are used to enhance the controlled illumination of the flame element 100. In some embodiments, in addition to the four illumination directions for projecting light onto the upper, lower, left and right areas of the flame element, the direction and placement of the light producing devices and light emitting elements may be arranged randomly to produce any desired visual effect, thereby allowing the illuminated flame areas on the flame element 100 to be modified to enable different visual effects.

Figure 2E:
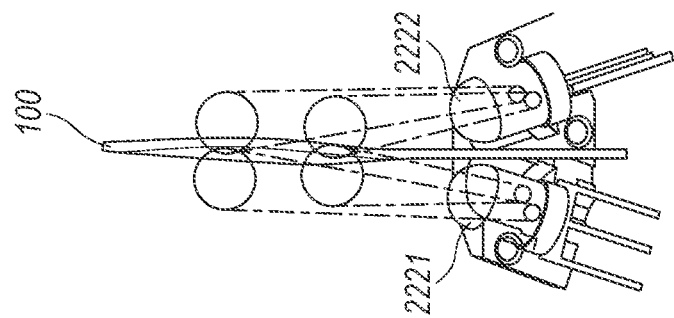
FIG. 2(E) illustrates an alternate positioning of light producing devices in accordance with an exemplary embodiment.
Figure 2D:
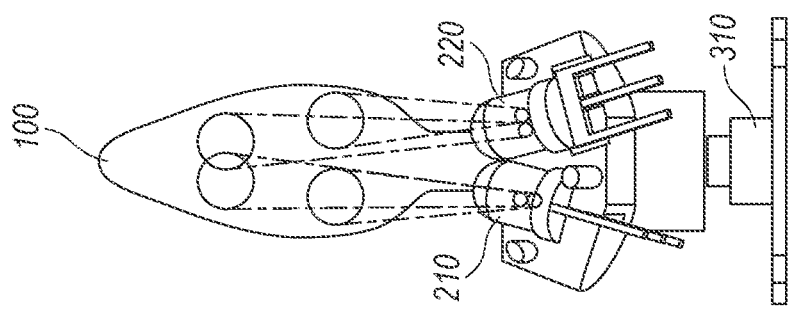
FIG. 2(D) illustrates an exemplary projection of light spots produced by imitation candle device of FIG. 2(C) in accordance with an exemplary embodiment.
Figure 2C:
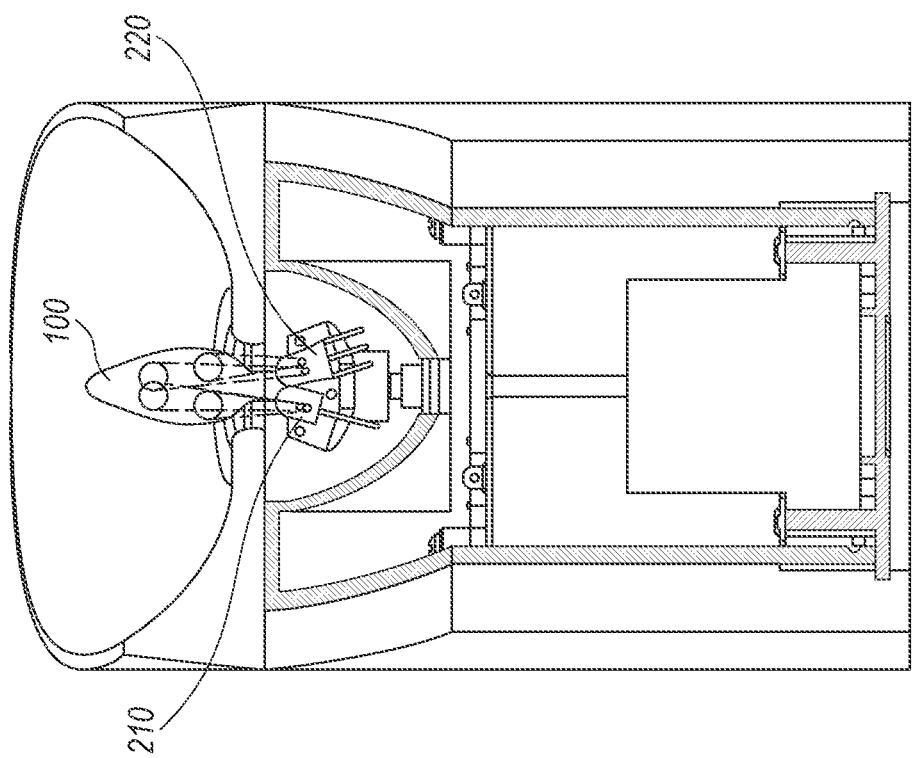
FIG. 2(C) illustrates an imitation candle device in accordance with an exemplary embodiment.

FIG. 2(C) illustrates an exemplary imitation candle device with a flame element 100 and two light producing devices 210 and 220 positioned to illuminate the flame element 100. FIG. 2(D) is a close up version of the flame simulation assembly, which more clearly shows the location of light producing devices 210 and 220 and the associated spots on the flame element 100. As evident from FIG. 2(D), the spots that illuminate the top section of the flame element 100 partially overlap with one another, whereas the spots that illuminate the lower portion of the flame element do not overlap. It should be noted, however, that the depicted spots only illustrate approximate illumination regions (e.g., areas that receive the brightest section of the incident light). Thus a small degree of overlap between the illuminated areas at the lower section of the flame element 100 may occur due to, for example, finite fall-off of light intensity. The overlap of the spots that illuminate the top section of the flame element 100 produces a brighter central section of the flame element 100 when both top spots are illuminated. By producing the proper modulation sequence of the different light emitting elements, proper movement of a flickering flame can be simulated on the stationary flame element 100. In one exemplary embodiment, the light assembly produces light for illumination of the flame element with a divergence angle of approximately 8 degrees (see FIG. 2(D)). In some embodiments, all light emitting elements of the imitation candle device produce light having the same color and the same maximum intensity. In some embodiments, the intensity of light can be modulated to produce the proper flickering effect. Such intensity modulation can be effectuated through on-off modulation, amplitude modulation, or other modulation techniques. In some embodiments, each light emitting element can operate at a color temperature in the range 1700-2350° K.

FIG. 2(E) shows another configuration for use in the flame simulation assembly that includes light producing devices 2221 and 2222 positioned to illuminate both sides of the flame element 100. The principles of operation for producing a flickering flame effect for the configuration in FIG. 2(E) are similar to those described earlier. The configuration in FIG. 2(E) produces a realistic flickering flame effect when the flame element 100 is viewed from both directions. In some embodiments, the patterns of illumination on both sides of the flame element 100 are synchronized with one another. In some embodiments, the flame element 100 is made of a translucent material that allows light that is incident thereupon to be diffused.

Figure 3:
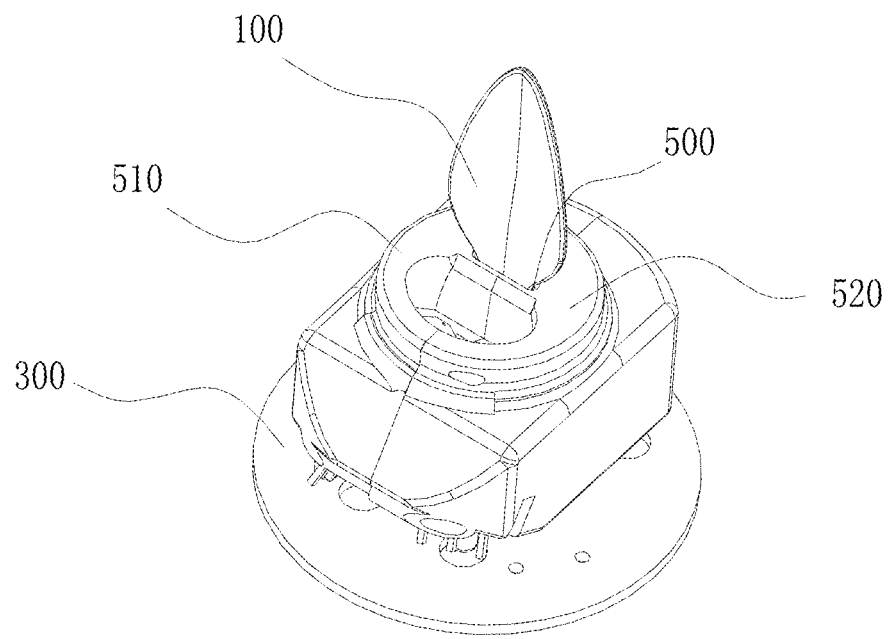
FIG. 3 illustrates a flame simulation assembly having a mounting rack in accordance with an exemplary embodiment.
Figure 4:
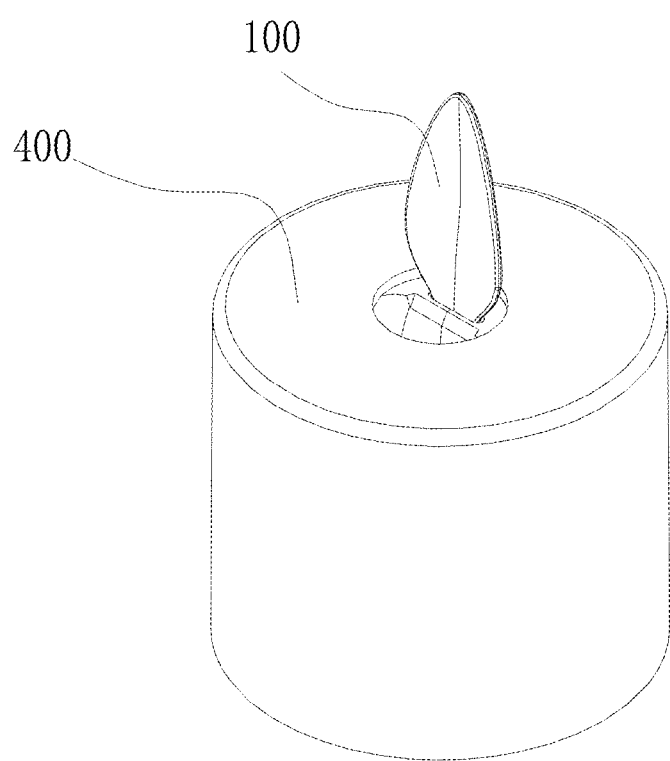
FIG. 4 illustrates a shell that is used in an imitation candle device in accordance with an exemplary embodiment.

In some embodiments, the flame element 100 is positioned within a mounting rack. In particular, FIG. 3 shows a mounting rack having a mounting cavity 500 that allows the flame element 100 to be mounted in the mounting cavity 500. In FIG. 3, the flame element 100 is disposed vertically, and the touch switch 310 is disposed under the flame element 100, below an opening at the lower end of the mounting cavity 500. The flame element 100 can be moved vertically in the mounting cavity 500. Thus, when a user pushes down on the flame element 100, the flame element 100 moves downward to trigger the switch 310. Specifically, the mounting rack includes a left bracket 510 and a right bracket 520, each having a groove such that after the left bracket 510 and the right bracket 520 are combined the flame sheet 100 can move vertically within the grooves.

FIGS. 4 through 7 illustrate an exemplary imitation candle device that includes a flame element 100 and a shell 400 that covers the internal components of the imitation candle device. In particular, the shell 400 covers the base 700, the light source 200 (see, e.g., FIG. 1) and the circuit board 300. As noted earlier, a light producing device 210, 220 can include at least two light emitting elements to illuminate different areas on at least one side of the flame element 100.

Figure 5:
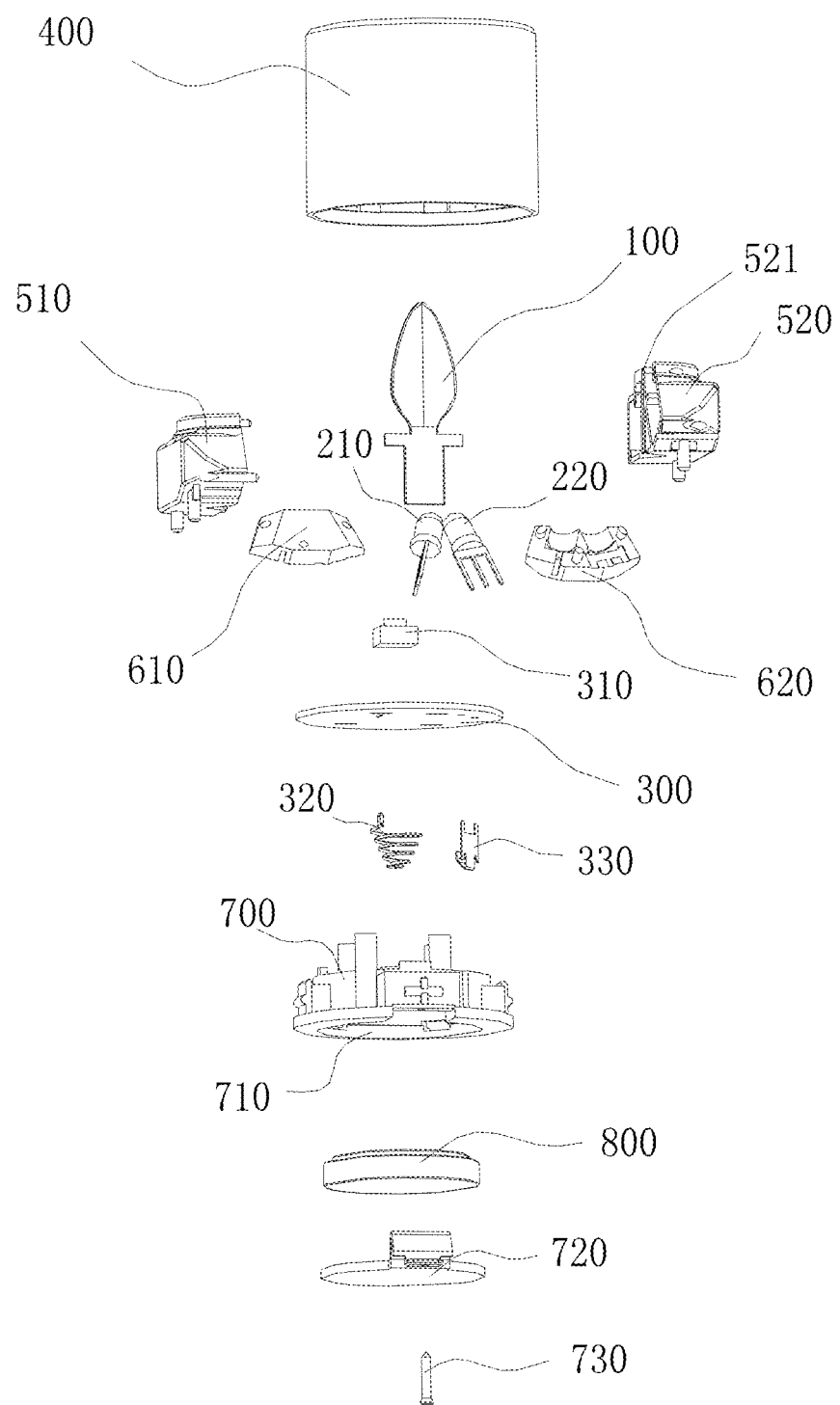
FIG. 5 illustrates certain components of an imitation candle device in accordance with an exemplary embodiment.

The flame element 100 and the light-emitting unit are mounted on a mounting rack. As described above, the mounting rack includes a left bracket 510 and a right bracket 520 that combine to form a support structure of the light source 200 and the flame element 100. In the depicted embodiment, a holder is used to mount the light-emitting unit. The holder is mounted on the combined structure of the left bracket 510 and the right bracket 520, and provides a platform for mounting the light source 200. At least part of the light emitting devices 210 and 220 protrude above a cavity formed by the holder. In some embodiments, the holder may also be divided into a left holder 610 and a right holder 620 (as shown in FIG. 5); when the two holder sections are brought together, they form the cavity that accommodates the light producing devices 210 and 220.

The circuit board 300 is located under the light-emitting unit, and is electrically connected to the light-emitting unit so as to control the modulation of light produced by the light emitting elements. Further, the circuit board 300 may include a touch switch 310. As noted earlier, the flame element 100 is disposed movably in the imitation candle device such that pushing on the flame element 100 triggers the touch switch 310, causing the imitation candle device to be turned on or off.

As noted earlier, the left bracket 510 and the right bracket 520 are provided with grooves 511 and 521, so as to form a mounting cavity for the flame element 100 when the left bracket 510 and the right bracket 520 are brought together. Thus, the flame element 100 may be mounted in the mounting cavity so as to enable its vertical movement. Such a vertical movement activates or deactivates the switch 310 that is placed below the flame element 100.

The base 700 of the imitation candle device further includes a battery container 710 and a battery cover 720. The battery cover 720 is fixed with a screw 730. A battery 800 may be placed in the battery container 710. The circuit board 300 is electrically connected to the battery 800 by, for example, an anode piece 330 and a cathode piece 320, and the battery 800 supplies power for the circuit board 300 and the light source 200.

Figure 8:
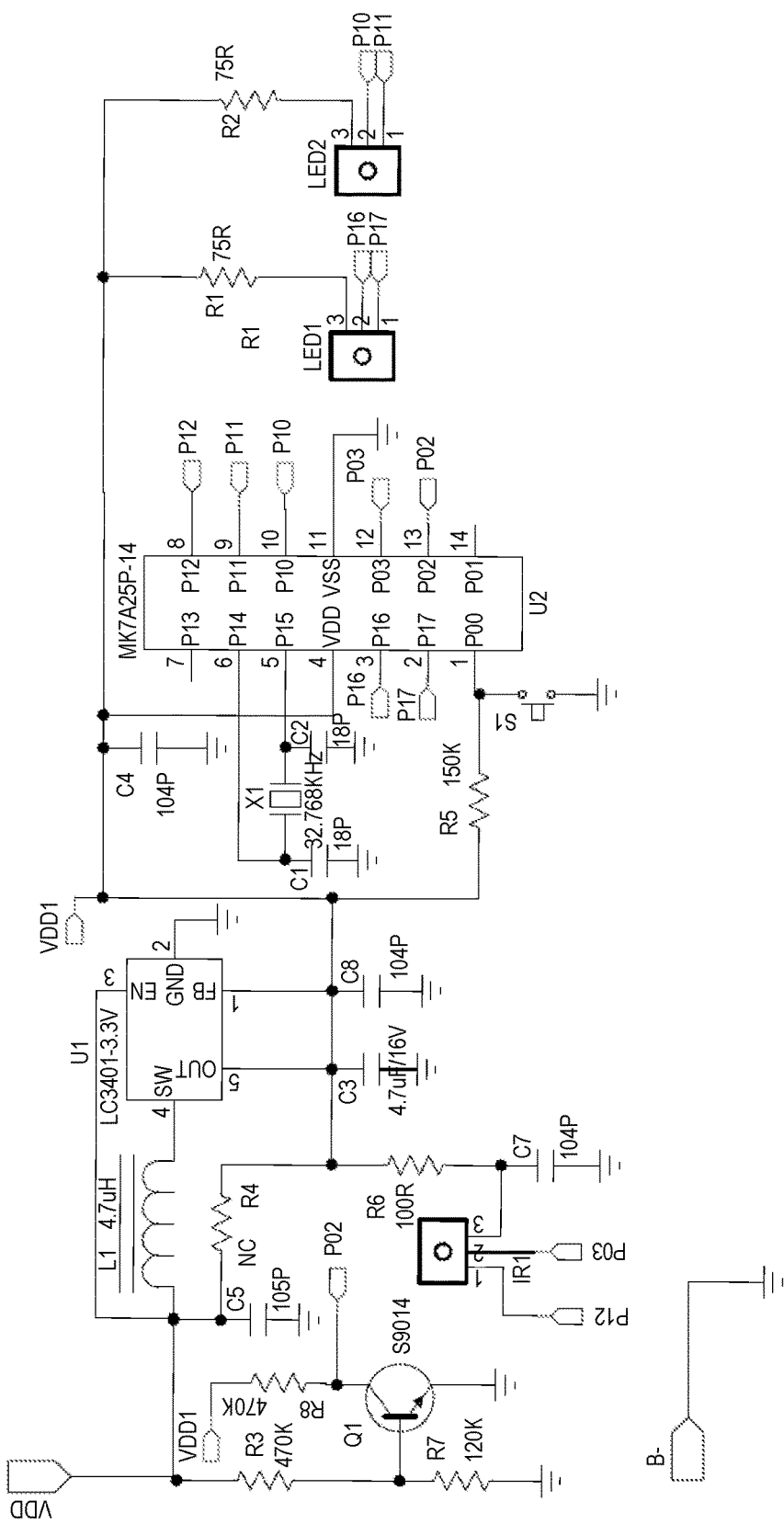
FIG. 8 is an exemplary circuit diagram associated with electronic components of an imitation candle device in accordance with an exemplary embodiment.

FIG. 8 shows an exemplary the circuit diagram for implementing various operations of the imitation candle device. The power supplied to the components in FIG. 8 is provided through two different power sources. The first power source (shown as being supplied through VDD in the upper left corner) is a battery (e.g., a CR2450 lithium-manganese dioxide button cell) that provides a DC supply voltage (e.g., 3V). The first supply is connected to a booster circuit having a capacitor C5, an inductor L1, a booster IC U1, one or more capacitors C3, C8, and other devices, so as to provide a stable (e.g., 3.3V) voltage. The second supply is a DC voltage (e.g., 3.3V) that is output from pin 5 of U1, and supplies power to the microcontroller unit (MCU) U2, to bi-color light sources LED1 and LED2 having yellow light and white light respectively, and to a remote receiver IR1. As such, in some embodiments, the imitation candle device of the present application can be controlled with a remote control device.

In operation, pins 2 and 3 of chip U2 form complementarily outputs that provide a square wave pattern to control the bi-color LED1 to be switched on and switched off in a periodic fashion so as to simulate a flickering flame. After a predetermined time interval (e.g., one minute), pins 9 and 10 of chip U2 complementarily output a pattern of square waves to control the LED2, and to allows it to be switched on and switched off in a similar manner as described above. These operations are continued to produce a realistic flickering flame effect.

Remote operation of the imitation candle device is enabled when the infrared receiver IR1 receives an infrared remote control signal. The signal is received on a pin of chip U2, causing the instructions that are embodied on a non-transitory storage medium (e.g., a ROM, a RAM, etc.) to be executed to implement the desired functionality. For example, the received IR signal, once decoded, can turn the imitation candle device on or off.

The components R3, R7, Q1 and R8 on the left hand side of FIG. 8 form a power supply detection circuit that can be coupled to chip U2. For example, when the battery is running out, such a circuit can generate a signal to stop the operations of the imitation candle device and to turn it off. The components C1, C2 and X1 form a timed oscillating circuit and components R5, S1, and pin 1 of U2 form an on/off switch circuit.

Figure 9:
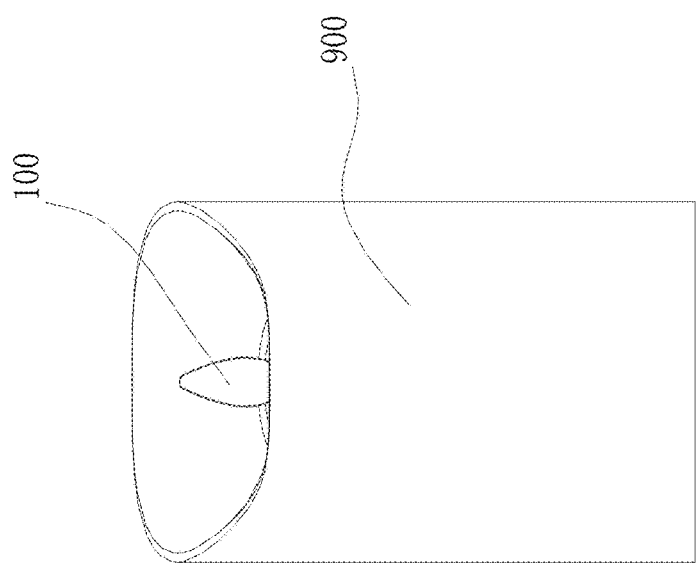
FIG. 9 illustrates another exemplary imitation candle device that includes a wax cylinder in accordance with an exemplary embodiment.

FIG. 9 shows another exemplary embodiment of the disclosed imitation candle device that additionally includes an outer cylinder 900 that can be made of a waxy substance, such as of paraffin wax, to resemble a real candle body. The cylinder 900 overs the shell 400 that was shown in FIGS. 4 and 5.

Figure 10:
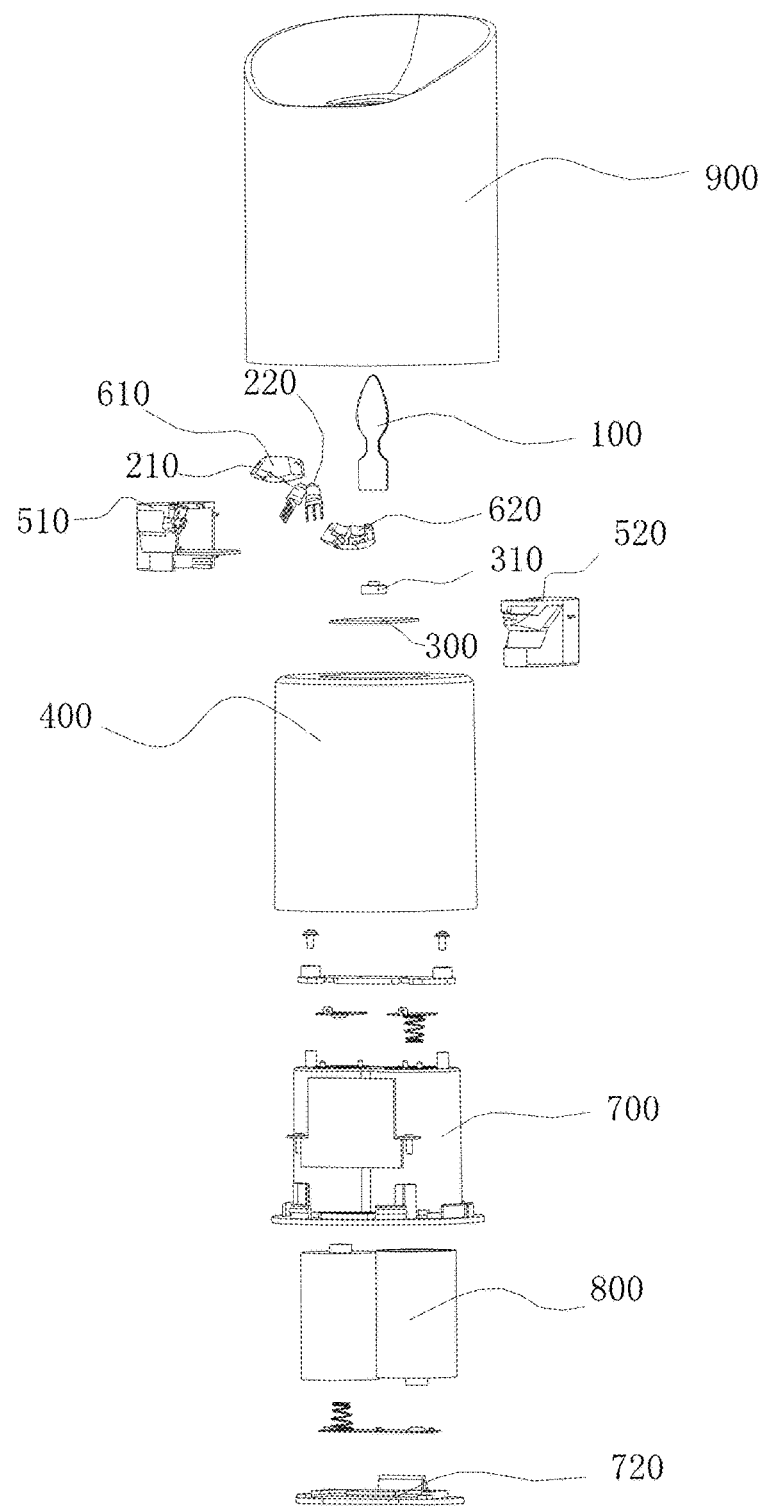
FIG. 10 illustrates certain components of the imitation candle device of FIG. 9.

FIG. 10 shows various components of the imitation candle device that are accommodated within the outer cylinder 900. Specifically, the electronic candle includes a flame element 100, a first LED 210, a second LED 220, a circuit board 300, a shell 400, a left bracket 510, a right bracket 520, a left holder 610, a right holder 620, a base 700, a battery 800, and a wax cylinder 900. The shell 400 covers the base 700, the left bracket 510 and the right bracket 520 serve as a support structure for the flame element 100 and for the LEDs. The left holder 610 and the right holder 620 are combined to form a cavity that accommodates the placement of the LEDs. The light emitting elements within the LEDs illuminate different areas of the flame element 100. The flame element 100 is movable in a vertical direction. The circuit board 300 is located under the flame element 100 and has a touch switch 310, which may be triggered by vertical movement of the flame element 100.

Figure 6:
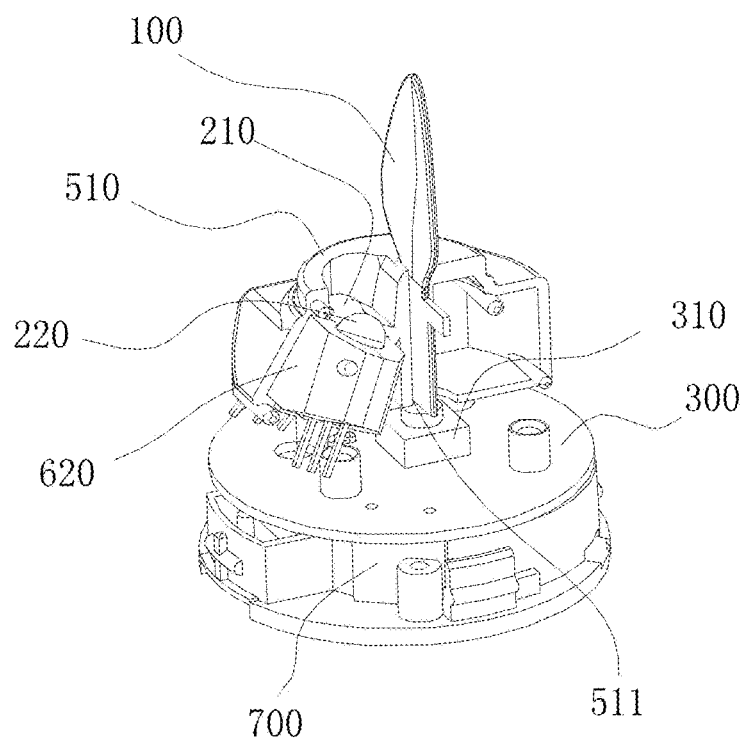
FIG. 6 illustrates certain components of a partially-assembled imitation candle device in accordance with an exemplary embodiment.
Figure 7:
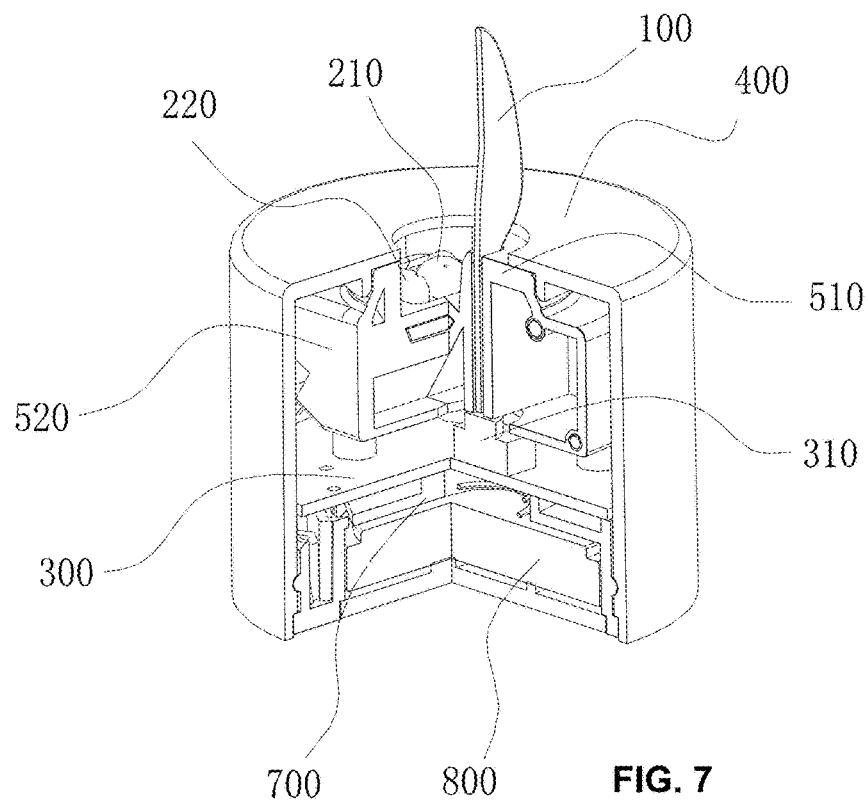
FIG. 7 illustrates components of an imitation candle device that are positioned under a shell in accordance with an exemplary embodiment.

In some embodiments, the flame element is formed such that its top portion extends upward parallel to the vertical axis that passes through the top surface of the imitation candle device (e.g., the vertical axis that passes through the center of the imitation candle device) (see e.g., FIGS. 1 and 6). In some embodiments, the top portion of the flame element that protrudes from the top of the candle body is curved away from the vertical axis at a small angle. Having such a curved top portion improves the simulation of a real life candle and facilitates proper focusing of the light spots on the flame surface.

Figure 11:
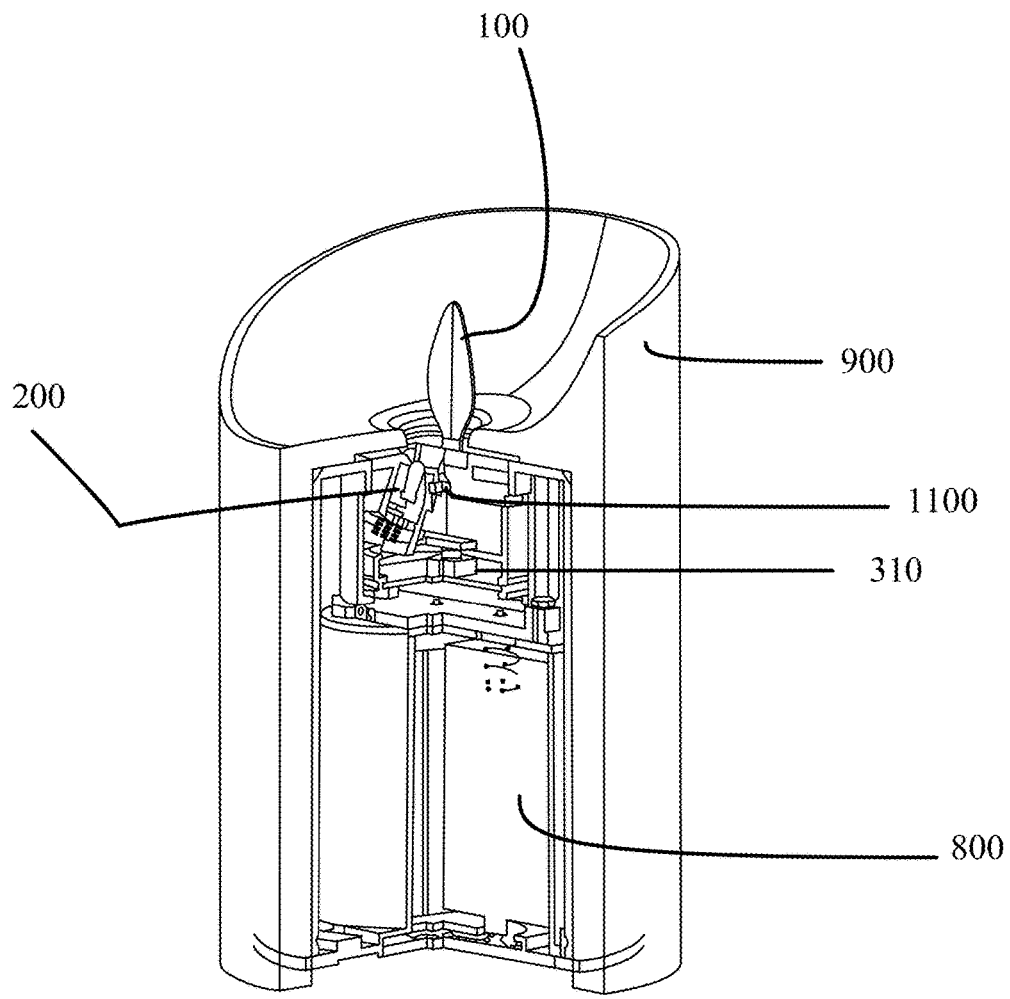
FIG. 11 illustrates another exemplary imitation candle device with a microphone for capturing sounds in accordance with an exemplary embodiment.

In some embodiments, a microphone is positioned within the imitation candle device for capturing the sound of a blow that is directed to the flame element. FIG. 11 illustrates an imitation candle device that incorporates a microphone 1100 positioned within the imitation candle device. The microphone 1100 converts acoustic signals into electrical signals that are provided to an electronic component on the circuit board 300. The microphone 1100 is positioned closer to the top surface of the imitation candle device to intercept sound waves that travel into the interior of the imitation candle device. For example, the top section of the imitation candle device can include an opening (e.g., the same opening that allows light from the light source 200 to reach the flame element 100) that allows the microphone 1100 to capture acoustic waves that travel down into the interior of the imitation candle device. In this way, when a user blows in the direction of the imitation flame element 100, the blow is captured by the microphone 1100, and the appropriate signals are generated to turn off the imitation candle device.

The electrical signals produced by the microphone 1100 can be processed by the components of the circuit board 300. The circuit board 300 can, for example, include filters, analog-to-digital circuits, transistors, resistors, capacitors, and/or a processor or controller (e.g., a microprocessor, a digital signal processor (DSP), an FPGA, an ASIC, etc.) that receive signals representing the captured sound waves. The processor can execute program code stored on a non-transitory storage medium, such as ROM, a RAM or other memory device, to process the signals corresponding to the sound waves and to determine that a blow has occurred. Upon detection of a blow, a corresponding signal can be produced to turn off the light source 200 and/or the entire imitation candle device. The program code that is executed by the processor can include an algorithm that differentiates between captured sounds of blowing air and other sounds such as clapping or human conversation. In some embodiments, the blow detection circuitry can be implemented as a separate component from other components of the circuit board 300. For example, the blow detection circuitry can be implemented using analog or digital circuits that receive the signals from the microphone, produce a voltage or current value in a predetermined range that is indicative of a blow, and provide such a voltage or signal to another component (e.g., a microcontroller on the circuit board 300) to turn the imitation candle off.

One aspect of the disclosed embodiments relates to an imitation candle device that includes a flame element shaped to resemble a candle flame and protruding from top of the imitation candle device, and a plurality of light emitting elements located within the imitation candle device and positioned to illuminate a plurality of areas on the flame element. The imitation candle device also includes electronic circuitry coupled to the plurality of light emitting elements to selectively modulate an intensity of each of the plurality of light emitting elements to simulate a flame movement in one or both of a vertical and a horizontal direction. Selective modulation of the plurality of light emitting elements includes generation of electric signals to modify an intensity of one or more of the plurality of illuminated areas positioned on a lower section of the flame element separately from one or more other illuminated areas on the flame element.

In one exemplary embodiment, the plurality of light emitting elements are positioned to project light onto four areas of the flame element such that a first light emitting element projects light onto a first area of the flame element, a second light emitting element projects light onto a second area of the flame element, a third light emitting element projects light onto a third area of the flame element, and a fourth light emitting element projects light onto a fourth area of the flame element. In another exemplary embodiment, the first area is located at a left section of the flame element, the second area is located at a right section of the flame element, the third area is located at a top section of the flame element, and the fourth area is located at a bottom section of the flame element. In yet another exemplary embodiment, the electric signals generated by the electronic circuitry modulate the intensity of the first and the second light emitting elements to produce an appearance of flame movement in the horizontal direction. In still another exemplary embodiment, the electric signals generated by the electronic circuitry modulate the intensity of the third and the fourth light emitting elements to produce an appearance of flame movement in the vertical direction.

According to one exemplary embodiment, the electric signals generated by the electronic circuitry modulate the intensity of the first and the second light emitting elements to produce an appearance of flame movement in the horizontal direction, and modulate the intensity of the third and the fourth light emitting elements to produce an appearance of flame movement in the vertical direction. In another exemplary embodiment, each of the plurality of light emitting elements produces an output light having a color temperature in the range 1700-2350° K. In still another exemplary embodiment, each of the plurality of light emitting elements produces light having the same color.

In one exemplary embodiment, each of the plurality of light emitting elements is positioned to illuminate only one area of the flame element with substantially no overlap with other areas of the flame element. In another exemplary embodiment, the first and the second light emitting elements are positioned such that the light projected onto the first area of the flame element partially overlaps with the light projected onto the second area of the flame element, where the first area and the second area are located on a top section of the flame element. In yet another exemplary embodiment, the third and the fourth light emitting elements are positioned such that the light projected onto the third area of the flame element does not substantially overlap with the light projected onto the fourth area of the flame element, where the third area and the fourth area are located on a bottom section of the flame element. In still another exemplary embodiment, the electric signals generated by the electronic circuitry modulate the intensity of the first and the second light emitting elements separately from the intensity of the third and the fourth light emitting elements to simulate differing flame movements at the top and at the bottom sections of the flame element.

In another exemplary embodiment, the above noted imitation candle device also includes a switch positioned below the flame element within the imitation candle device, where the flame element is movably positioned within the imitation candle device such that a vertical movement of the flame element activates the switch to turn the imitation candle device on or off. In one exemplary embodiment, the plurality of the light emitting elements are positioned within the imitation candle device to illuminate the plurality of areas that are located on one side of the flame element. In another exemplary embodiment, the plurality of the light emitting elements are positioned within the imitation candle device to illuminate the plurality of areas that are located on two sides of the flame element.

In another exemplary embodiment, at least two of the plurality of the light emitting elements are formed as a first light emitting device (LED) that is oriented in a first direction to project a first set of spots onto the flame element, and at least two other of the plurality of the light emitting elements are formed as a second light emitting device (LED) that is oriented in a second direction to project a second set of spots onto the flame element. In one exemplary embodiment, the imitation candle device further includes a mounting rack that includes a cavity, where the mounting rack is positioned within the imitation candle device to allow the flame element to be mounted in the cavity of the mounting rack. In another exemplary embodiment, the mounting rack includes a pair of grooves to receive the flame element and to allow the flame element to move along the grooves of the mounting rack.

In one exemplary embodiment, the imitation candle device further includes a cylindrical outer shell made of a wax-like material to resemble a body of a true candle. In another exemplary embodiment, the imitation candle device also includes a microphone that is electrically coupled to the electronic circuitry and is positioned within the imitation candle device to detect a sound of a blow of air directed at the flame element and to generate an electrical signal in response to the sound of the blow of air for turning off the imitation candle device. In another exemplary embodiment, a top portion of the flame element is curved away from a vertical axis that passes through top of the imitation candle device.

Another aspect of the disclosed technology relates to a light-emitting control assembly for use in an electronic candle. The light-emitting control assembly includes a plurality of light emitting elements positioned at an angle with respect to a vertical axis that passes through center of the light-emitting control assembly. Each of the plurality of light emitting elements projects a spot of light for illuminating a particular area of a flame element, and the plurality of light emitting elements are positioned to project a set of partially overlapping light spots and a set of substantially non-overlapping light spots. The light-emitting control assembly also includes a circuit board including a microcontroller coupled to the plurality of light emitting elements to produce electrical signals to modulate an intensity of a first group of light emitting elements separately from a second group of light emitting elements and to simulate an appearance of a moving flame upon projection of the overlapping light spots and the substantially non-overlapping light spots on the flame element.

In one exemplary embodiment, the plurality of light sources are positioned to project the set of partially overlapping light spots upon a top portion of the flame element, and the substantially non-overlapping light spots upon a lower section of the flame element. In another exemplary embodiment, the plurality of the light emitting elements are positioned with respect to the flame element such that a divergence angle of the combined light emanating from the plurality of the light emitting elements and reaching the flame element is about 8 degrees. In yet another exemplary embodiment, the microcontroller is configured to produce an on-off modulation signal to modulate the intensity of the first group of light emitting elements, and another on-off modulation signal to modulate the intensity of the second group of light emitting elements to produce an appearance of a flame movement in a vertical direction.

In another exemplary embodiment, the microcontroller is configured to produce modulation signals to cause a different pattern of intensity variations for those light emitting elements that illuminate a bottom portion of the flame element and those light emitting elements that illuminate a top portion of the flame element. In yet another exemplary embodiment, the first group of light emitting elements produce illumination spots that are aligned in a horizontal direction, and the second group of light emitting elements produce illumination spots that are aligned in a vertical direction.

Another exemplary embodiment relates to an electronic candle and a flame simulation assembly thereof. The flame simulation assembly includes a flame element used to simulate the shape of flame, at least one source to simulate the flame element, and a circuit board to control the light-emitting element. The source has at least two light-emitting elements. Such light emitting elements from the same light producing device irradiate different areas at the same side of the flame element. The circuit board controls different light emitting elements, causing them to, for example, be turned on or off, so that areas on the flame elements irradiated are bright or dark, thereby creating an effect of flickering candle light.

In one embodiment, an electronic candle includes a base, a shell that covers the base, a flame element, where the flame element is at least partially exposed outside the shell. The electronic candle further includes a source to simulate the flame effect, where the light source is positioned to provide light to a surface of the flame element. The electronic candle also includes a circuit board to control the light source, wherein one light source has at least two light-emitting chips, and the chips of the same source irradiate different areas on one side of the flame element.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. An imitation candle device, comprising:
   a flame element shaped to resemble a candle flame and protruding from top of the imitation candle device;
   a plurality of light emitting elements located within the imitation candle device and positioned to illuminate a plurality of areas on the flame element;
   electronic circuitry coupled to the plurality of light emitting elements to selectively modulate an intensity of each of the plurality of light emitting elements to simulate a flame movement in both a vertical and a horizontal direction, wherein selective modulation of the plurality of light emitting elements includes generation of electric signals to modify an intensity of one or more of the plurality of illuminated areas positioned on a lower section of the flame element to simulate a movement of the lower section of the flame element separately from one or more other illuminated areas on the flame element.

2. The imitation candle device of claim 1, wherein the plurality of light emitting elements are positioned to project light onto four areas of the flame element such that a first light emitting element projects light onto a first area of the flame element, a second light emitting element projects light onto a second area of the flame element, a third light emitting element projects light onto a third area of the flame element, and a fourth light emitting element projects light onto a fourth area of the flame element.

3. The imitation candle device of claim 2, wherein the first area is located at a left section of the flame element, the second area is located at a right section of the flame element, the third area is located at a top section of the flame element, and the fourth area is located at a bottom section of the flame element.

4. The imitation candle device of claim 3, wherein the electric signals generated by the electronic circuitry modulate the intensity of the first and the second light emitting elements to produce an appearance of flame movement in the horizontal direction.

5. The imitation candle device of claim 3, wherein the electric signals generated by the electronic circuitry modulate the intensity of the third and the fourth light emitting elements to produce an appearance of flame movement in the vertical direction.

6. The imitation candle device of claim 3, wherein the electric signals generated by the electronic circuitry modulate the intensity of the first and the second light emitting elements to produce an appearance of flame movement in the horizontal direction, and modulate the intensity of the third and the fourth light emitting elements to produce an appearance of flame movement in the vertical direction.

7. The imitation candle device of claim 2, wherein:
   the first and the second light emitting elements are positioned such that the light projected onto the first area of the flame element partially overlaps with the light projected onto the second area of the flame element, and
   the first area and the second area are located on a top section of the flame element.

8. The imitation candle device of claim 7, wherein:
   the third and the fourth light emitting elements are positioned such that the light projected onto the third area of the flame element does not substantially overlap with the light projected onto the fourth area of the flame element, and
   the third area and the fourth area are located on a bottom section of the flame element.

9. The imitation candle device of claim 8, wherein the electric signals generated by the electronic circuitry modulate the intensity of the first and the second light emitting elements separately from the intensity of the third and the fourth light emitting elements to simulate differing flame movements at the top and at the bottom sections of the flame element.

10. The imitation candle device of claim 1, wherein each of the plurality of light emitting elements produces an output light having a color temperature in the range 1700-2350° K.

11. The imitation candle device of claim 1, wherein each of the plurality of light emitting elements produces light having the same color.

12. The imitation candle device of claim 1, wherein each of the plurality of light emitting elements is positioned to illuminate only one area of the flame element with substantially no overlap with other areas of the flame element.

13. The imitation candle device of claim 1, further comprising a switch positioned below the flame element within the imitation candle device, wherein
the flame element is movably positioned within the imitation candle device such that a vertical movement of the flame element activates the switch to turn the imitation candle device on or off.

14. The imitation candle device of claim 1, wherein the plurality of the light emitting elements are positioned within the imitation candle device to illuminate the plurality of areas that are located on one side of the flame element.

15. The imitation candle device of claim 1, wherein the plurality of the light emitting elements are positioned within the imitation candle device to illuminate the plurality of areas that are located on two sides of the flame element.

16. The imitation candle device of claim 1, wherein:
at least two of the plurality of the light emitting elements are formed as a first light emitting device (LED) that is oriented in a first direction to project a first set of spots onto the flame element, and
at least two other of the plurality of the light emitting elements are formed as a second light emitting device (LED) that is oriented in a second direction to project a second set of spots onto the flame element.

17. The imitation candle device of claim 1, further comprising a mounting rack including a cavity, the mounting rack positioned within the imitation candle device to allow the flame element to be mounted in the cavity of the mounting rack.

18. The imitation candle device of claim 17, wherein the mounting rack includes a pair of grooves to receive the flame element and to allow the flame element to move along the grooves of the mounting rack.

19. The imitation candle device of claim 1, further comprising a cylindrical outer shell made of a wax-like material to resemble a body of a true candle.

20. The imitation candle device of claim 1, further comprising a microphone electrically coupled to the electronic circuitry, the microphone positioned within the imitation candle device to detect a sound of a blow of air directed at the flame element and to generate an electrical signal in response to the sound of the blow of air for turning off the imitation candle device.

21. The imitation candle device of claim 1, wherein a top portion of the flame element is curved away from a vertical axis that passes through top of the imitation candle device.

22. A light-emitting control assembly for use in an electronic candle, comprising
a plurality of light emitting elements positioned at an angle with respect to a vertical axis that passes through center of the light-emitting control assembly, each of the plurality of light emitting elements projecting a spot of light for illuminating a particular area of a flame element, the plurality of light emitting elements positioned to project a set of partially overlapping light spots and a set of substantially non-overlapping light spots; and
a circuit board comprising a microcontroller coupled to the plurality of light emitting elements to produce electrical signals to modulate an intensity of a first group of light emitting elements separately from a second group of light emitting elements and to simulate an appearance of a moving flame in both a vertical and a horizontal direction upon projection of the overlapping light spots and the substantially non-overlapping light spots on the flame element.

23. The light-emitting control assembly of claim 22, wherein the plurality of light sources are positioned to project the set of partially overlapping light spots upon a top portion of the flame element, and the substantially non-overlapping light spots upon a lower section of the flame element.

24. The light-emitting control assembly of claim 22, wherein:
at least two of the plurality of the light emitting elements are formed as a first light emitting device (LED) that is oriented in a first direction, and
at least two other of the plurality of the light emitting elements are formed as a second light emitting device (LED) that is oriented in a second direction.

25. The light-emitting control assembly of claim 22, wherein the plurality of the light emitting elements are positioned with respect to the flame element such that a divergence angle of the combined light emanating from the plurality of the light emitting elements and reaching the flame element is about 8 degrees.

26. The light-emitting control assembly of claim 22, wherein the microcontroller is configured to produce an on-off modulation signal to modulate the intensity of the first group of light emitting elements, and another on-off modulation signal to modulate the intensity of the second group of light emitting elements to produce an appearance of a flame movement in the vertical direction.

27. The light-emitting control assembly of claim 22, wherein the microcontroller is configured to produce modulation signals to cause a different pattern of intensity variations for those light emitting elements that illuminate a bottom portion of the flame element and those light emitting elements that illuminate a top portion of the flame element.

28. The light-emitting control assembly of claim 22, wherein each of the plurality of light emitting elements produces an output light having a color temperature in the range 1700-2350° K.

29. The light-emitting control assembly of claim 22, wherein the first group of light emitting elements produce illumination spots that are aligned in the horizontal direction, and the second group of light emitting elements produce illumination spots that are aligned in the vertical direction.

* * * * *